United States Patent [19]

Reneau

[11] Patent Number: 4,877,927
[45] Date of Patent: Oct. 31, 1989

[54] EXTENDED DWELL SHOCK SENSING DEVICE

[75] Inventor: Daniel R. Reneau, Madison, Wis.

[73] Assignee: Hamlin Incorporated, Lake Mills, Wis.

[21] Appl. No.: 334,311

[22] Filed: Apr. 6, 1989

[51] Int. Cl.[4] ............................................. H01H 35/14
[52] U.S. Cl. ............................. 200/61.45 M; 335/205
[58] Field of Search ................... 200/61.45 R–61.53, 200/81.9 M, 82 E, 83 L, 84 C; 335/205, 206

[56] References Cited

U.S. PATENT DOCUMENTS

| | | | |
|---|---|---|---|
| 2,963,563 | 12/1960 | Patterson | 200/81.9 M |
| 2,976,378 | 3/1961 | Goddard | 200/61.45 R |
| 3,057,977 | 10/1962 | Caswell | 200/81.9 M |
| 3,097,272 | 5/1962 | Hautly | 200/61.49 |
| 3,327,079 | 6/1967 | Widl | 200/82 R |
| 3,412,391 | 11/1968 | Ward | 340/690 |
| 3,701,064 | 10/1972 | Kinoshita et al. | 335/205 |
| 3,737,599 | 6/1973 | Zuvela | 200/61.45 R |
| 3,795,780 | 3/1974 | Lawrie | 200/61.45 R |
| 3,853,199 | 12/1974 | Hirashima et al. | 180/274 |
| 3,945,459 | 3/1976 | Oishi et al. | 180/274 |
| 4,016,535 | 4/1977 | Oinlocker | 340/440 |
| 4,081,635 | 3/1978 | Moore | 200/81.9 M |
| 4,087,782 | 5/1978 | Oishi et al. | 180/271 |
| 4,181,835 | 1/1980 | Stadler et al. | 200/82 E |
| 4,484,041 | 11/1984 | Andres et al. | 200/61.45 M |
| 4,518,835 | 5/1985 | Grossar | 200/61.45 M |
| 4,596,971 | 5/1986 | Hirabayashi et al. | 335/205 |
| 4,639,563 | 1/1987 | Gunther | 200/61.45 M |
| 4,705,922 | 11/1987 | Seeger et al. | 200/61.45 M |

Primary Examiner—J. R. Scott
Attorney, Agent, or Firm—Lathrop & Clark

[57] ABSTRACT

An extended dwell shock sensing device (10) is constructed to operate in two stages. A carriage (34) that includes a magnet (40) is slidably mounted between a first abutment (20) and a second abutment (22). The carriage (34) also includes a cradle (52) in which a non-magnetic mass (54) is slidably mounted between a first wall (53) and a second wall (55). At a rest position, the carriage (34) is biased away from the second abutment (22) by a spring (50) and the non-magnetic mass (54) is biased away from the second wall (55) by a spring (58). A reed switch (24) is mounted to be responsive to the position of the magnet (40). Upon application of an acceleration force, the shock sensing device (10) operates in two stages. In a first stage, the carriage (34) travels to a position where it approaches the second abutment (22), and activates the reed switch (24). In a second stage, the non-magnetic mass (54) travels toward the second wall (55). The inertia of the non-magnetic mass (54) resisting a rapid change in the return direction of the carriage (54), combined with the relatively long distance to travel back to the first stage position extends the time that the reed switch (24) stays activated.

34 Claims, 3 Drawing Sheets

ACCELERATION FORCE ←

ACCELERATION FORCE ←

ACCELERATION FORCE ←

EXTENDED DWELL SHOCK SENSING DEVICE

FIELD OF THE INVENTION

This invention relates to shock sensors that employ magnetic reed switches activated upon acceleration of sufficient magnitude.

BACKGROUND OF THE INVENTION

Shock sensors have been used in motor vehicles to detect a vehicle collision and to activate an electronic circuit for the actuation of safety devices, such as to tension safety belts, to inflate air bags, to shut off fuel systems, to activate radio signals, or to actuate other desired systems. Such shock sensors typically employ a reed switch having ferromagnetic contacts and operate such that the mass of a magnet or ferromagnetic shunt is accelerated by vehicle impact against a biasing and restoring force such as a wire spring or repelling magnet. See, e.g. U.S. Pat. Nos. 4,484,041 and 4,639,563 issued to Andres et al., and Gunther, respectively. The change in magnet position or the resultant shunting causes a change in the magnetic field relative to reed switch sensitivity. The change in magnetic field therefore acts as a means of operating the reed switch contacts.

The shock sensors that employ a reed switch typically have a carriage that slidably travels between a first abutment and a second abutment. The carriage may comprise a magnet and the reed switch is positioned within the shock sensor so that the reed switch is activated by the change in magnetic field exerted upon the reed switch by the magnet as the carriage travels from the first abutment to the second abutment and back again. The duration that the reed switch remains activated depends upon the sensitivity of the reed switch, the strength of the magnet, and the dwell time of the carriage, i.e. the time necessary for the carriage to travel between the first and second abutments. The shock sensors of the prior art have a relatively short dwell time. To increase the closure duration of the reed switch, the sensitivity of the contacts of the reed switch may be increased or the magnetic field of the magnet may be increased. A limitation is that as the magnetic field increases the sensitivity region increases correspondingly and the area between adjacent sensitivity regions decreases, to a point where there is no longer a "rest" position left for the magnet.

SUMMARY OF THE INVENTION

In accordance with the present invention, a shock sensing device has an extended dwell and maintains high reed switch sensitivity to accurately identify the occurrence of vehicle impact. A carriage that includes a magnet is slidably mounted between first and second abutments. The carriage also includes a cradle in which a non-magnetic mass is slidably mounted between a first wall and a second wall. When the shock sensor is at rest, or subject to no acceleration forces, the carriage is biased by a first spring away from the second abutment and the non-magnetic mass is biased by a second spring away from the second wall. A reed switch is mounted to be responsive to the position of the magnet.

Upon application of an acceleration force, the shock sensing device operates in two stages. In a first stage, the carriage mass travels to a position where it approaches the second abutment, and simultaneously activates the reed switch. In a second stage, the non-magnetic mass travels toward, and compresses the second spring against the carriage second wall. The inertial force of the non-magnetic mass thus transferred to the carriage second wall maintains the carriage and magnet in the reed switch activating position during the entire travel period of the non-magnetic mass. The relatively long distance of travel for the non-magnetic mass back to its first stage position extends the time that the reed switch stays activated.

The increased activation time of the reed switch thus permits for the use of an optimized sensitivity region for the reed switch and a corresponding circuitry simplification, inasmuch as it is easier to design a circuit that employs an activation signal of longer duration. A shock sensor of longer dwell time and a corresponding longer activation time also is subject to less false identifications of vehicle collisions or occupant threatening deceleration. Further objects, features, and advantages of the invention will be apparent from the following detailed description taken in conjunction with the accompanying drawings.

DESCRIPTION OF THE PREFERRED EMBODIMENT

Figure 2:
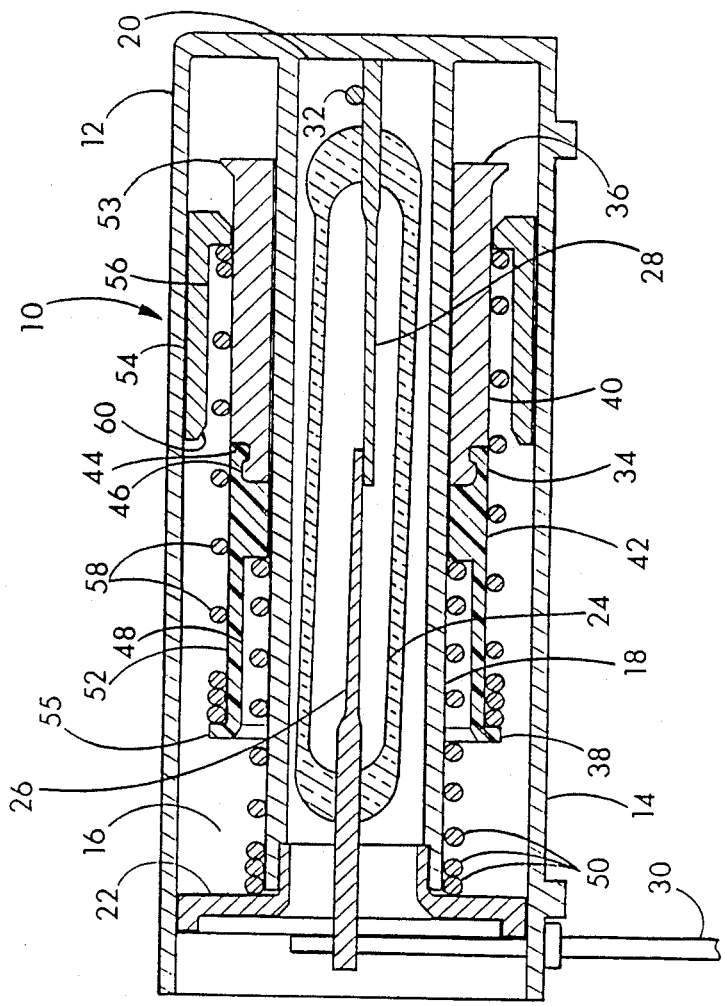
FIG. 2 is a section view of the extended dwell shock sensing device taken along section line 2—2 of FIG. 1.
Figure 1:
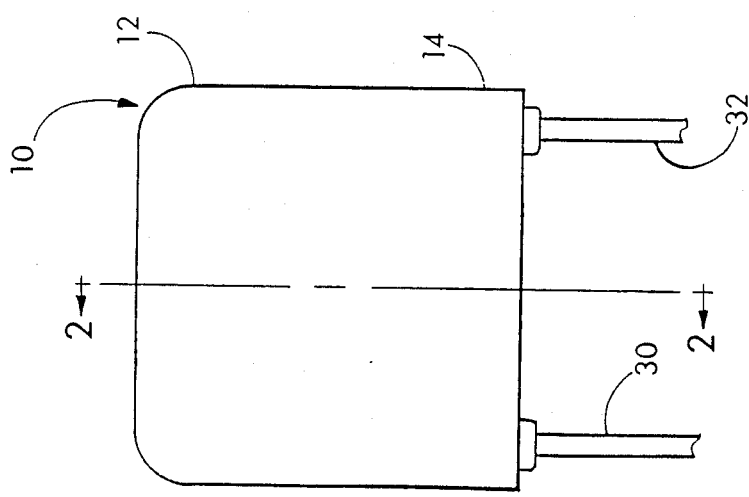
FIG. 1 is an end view of the extended dwell shock sensing device of the present invention.

With reference to the drawings, an extended dwell shock sensing device is shown generally at 10 in FIGS. 1 and 2. The shock sensing device 10 includes a capsule 12 having a housing 14 that defines a cavity 16 that surrounds a horizontal reed switch compartment in the preferred form of a pipe 18. The interior of the housing 14 is bounded by a first abutment 20 and a second abutment 22, the pipe 18 extending between the abutments 20 and 22. Mounted within the pipe 18 is a reed switch 24 having contact blades 26 and 28, which are normally in the open position. The contact blades 26 and 28 are electrically connected with switch terminals 30 and 32, respectively. A tubular carriage 34 is slidably mounted upon the pipe 18, the carriage 34 having a first end 36 and a second end 38. The carriage 34 is oriented within the cavity 16 so that the first end 36 of the carriage 34 faces the first abutment 20 and the second end 38 of the carriage 34 faces the second abutment 22. The carriage 34 includes a permanent magnet portion 40 that moves coincident with the carriage 34, and a non-magnetic sleeve 42. The magnet 40 has its north and south poles in a horizontal orientation facing the abutments 20 and 22. The non-magnetic sleeve 42 is preferably formed of plastic and is locked into the magnet 40 by snap fingers 44 that fit over a ring 46 cut around the magnet 40. As depicted in FIG. 2, the first end 36 of the carriage 34 is formed upon the magnet 40 and the second end 38 of the carriage 34 is formed upon the non-magnetic sleeve 42.

The non-magnetic sleeve 42 of the carriage 34 has a notch 48 that allows a first spring 50 to fit therein, the spring 50 fitting around the pipe 18 and within the notch 48. The spring 50 ordinarily biases the carriage 34 such that the first end 36 is positioned against the first abutment 20. The second end 38 of the carriage 34 that is formed upon the non-magnetic sleeve 42 is radiused or chamfered to gather loose coils of the spring 50 upon movement of the carriage 34 across the pipe 18. A cradle 52 having a first wall 53 and a second wall 55 is formed within the carriage 34 such that a non-magnetic mass 54 may be slidably mounted about the cradle 52 to be capable of travel on the cradle between the first and second walls 53 and 55. The cradle 52 is oriented so that the first wall 53 faces the first abutment 20 and the second wall 55 is opposite the first abutment 20. The travel of the non-magnetic mass 54 on the cradle 52 is parallel to the travel of the carriage 34 upon the pipe 18. The non-magnetic mass 54 is annular-shaped, fitting between the housing 14 and the cradle 52, and is made of dense material to be as heavy as possible for its size. The non-magnetic mass 54 has a notch 56 that allows a second spring 58 to fit therein, the spring 58 fitting around the cradle 52 and within the notch 56. The spring 58 should be of relative low spring rate and long free length. The spring 58 ordinarily biases the non-magnetic mass 54 away from the second wall 55. A leading end 60 of the non-magnetic mass 54 is radiused or chamfered to gather loose coils of the spring 58 upon movement of the non-magnetic mass 54 within the cradle 52.

The shock sensing device 10, as embodied in FIGS. 1 and 2, is used to sense a deceleration force generally directed from the second abutment 22 toward the first abutment 20. Under circumstances of a collision, the housing 14 of the shock sensing device 10 and a vehicle in which the device 10 is mounted would be subject to rapid deceleration in the direction just described. However, when the device 10 is subject to such deceleration, the carriage 34 would move relative to the housing 14 with an acceleration force in the direction from the first abutment 20 to the second abutment 22.

Figure 3A:
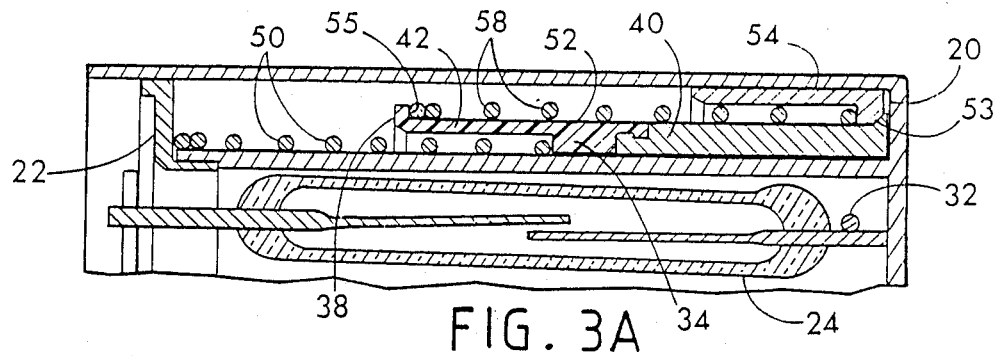
FIG. 3A is a partial schematic half-section view of the extended dwell shock sensing device of FIG. 2 which shows the carriage of the shock sensing device being subjected to an acceleration force of 0 G, the device being at a rest position.
Figure 3B:
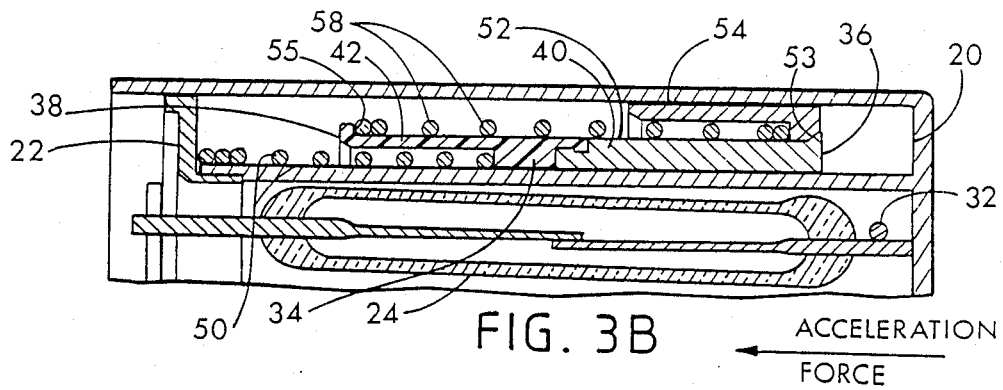
FIG. 3B is a view similar to FIG. 3A which shows the carriage of the shock sensing device being subjected to an acceleration force of 4 G's in the direction of the arrow, the device being slightly into activation.
Figure 3C:
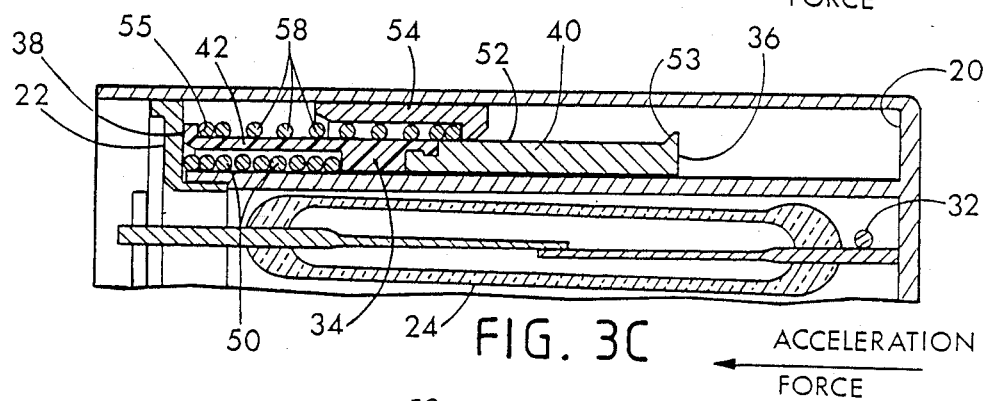
FIG. 3C is a view similar to FIG. 3A which shows the carriage of the shock sensing device being subjected to an acceleration force of 8 G's in the direction of the arrow, the device continuing into activation.
Figure 3D:
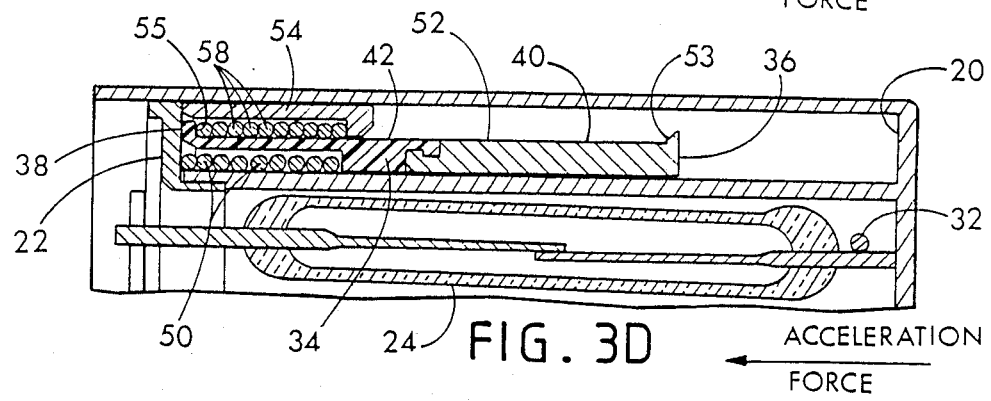
FIG. 3D is a view similar to FIG. 3A which shows the carriage of the shock sensing device being subjected to an acceleration force of 20 G's in the direction of the arrow, the device being fully activated.

The operation of the extended dwell shock sensing device 10 of the present invention is depicted in FIGS. 3A, 3B, 3C, and 3D. These FIGURES show only the upper half of the device depicted in FIG. 2, except that the entire read switch is schematically shown in full section. The device senses deceleration in one direction, as with standard reed switch shock sensor designs, but has a mechanically extended closure duration, referred to herein as "dwell time" or "dwell." FIG. 3A shows the device 10 experiencing 0 G deceleration, where G is the unit of force exerted on a body by the pull of gravity at the earth's surface, frequently referred to as the "acceleration of gravity." The carriage 34 is biased away from the second abutment 22 and against the first abutment 20 by the spring 50. FIG. 3B shows the device 10 slightly into activation and the carriage 34 experiencing acceleration of approximately 4 G's generally directed toward the second abutment 22. Typically, this condition would occur if the shock sensing device were mounted in a vehicle with the second abutment oriented forwardly and the vehicle were to experience a sharp deceleration while moving forwardly, such as if the vehicle would strike a stationary object. By activation of the shock sensing device 10, it is understood to mean closure of the normally open contact blades 26 and 28 by the application of a magnetic field by the magnet 40. At the sequence depicted in FIG. 3B, the carriage 34 has moved such that the first end 36 has moved away from the first abutment 20 and the center of the magnet 40 is just short of the center of the overlap of the contact blades 26 and 28 of the reed switch 24. The spring 58 which biases the non-magnetic mass 54 is pre-loaded such that the non-magnetic mass 54 has not, at this point, yet moved relative to the magnet 40. At FIG. 3C, the device remains activated. Experiencing an increasing acceleration force of approximately 8 G's, the second end 38 of the carriage 34 now is abutted against the second abutment 22. The center of the magnet 40 is in line with the center of the overlap of the contact blades 26 and 28 of the reed switch 24, so that the magnet 40 is in an optimal position with respect to the application of a maximum magnet field upon the reed switch 24. At the point where the second end 38 of the carriage 34 abuts against the second abutment 22, the non-magnetic mass 54 begins traversing across the cradle 52 toward the second wall 55. While the non-magnetic mass 54 is traversing across the cradle 52, the magnet 40 is held in optimal position with respect to the application of a maximum magnetic field upon the reed switch 24. The acceleration force has increased to 20 G's in FIG. 3D, thereby causing the non-magnetic mass 54 to complete its stroke to fully compress the spring 58 and abut against the second wall 55 of the cradle 52. The depiction of FIG. 3D represents a fully activated position. The position in FIGS. 3A, 3B, 3C, and 3D are then the same in return sequence, in reverse order from that just described.

The shock sensing device 10 of the present invention therefore has two stages to extend the dwell time of the carriage 34, thus lengthening the duration of the closure of the contact blades 26 and 28. The first stage is the travel of the carriage 34 from a position against the first abutment 20 to a position against the second abutment 22. This first stage takes place upon an acceleration force of a pre-selected magnitude. The second stage is the travel of the non-magnetic mass 54 from a position against the first wall 53 to a position against the second wall 55. This second stage takes place when the acceleration force continues to increase to a second pre-selected magnitude. The inertial force of the non-magnetic mass 54 thus transferred to the second wall 55 maintains the carriage 34 and magnet 40 in the reed switch activating positions during the entire travel period of the non-magnetic mass 54. The relatively long distance of travel for the non-magnetic mass 54 back to the 4 G's position of FIG. 3B extends the time that the reed switch stays activated, i.e. the duration of the closure of the contact blades 26 and 28. It is to be noted that the G forces herein given to represent the various stages of activation are exemplary and may vary due to changes in spring constants of the springs 50 and 58, weight of the vehicle, weights of the non-magnetic mass 54, the sleeve 42, and the magnet 40, and coefficients of friction between the slidably mounted parts. The difference in operation between the shock sensing device 10 of the present invention and those of the prior art is the greatly increased activation duration of the device of the present invention. The closure duration of the contact blades of the reed switches of the prior art may for a given deceleration pulse be approximately in the range of 15 milliseconds, whereas the shock sensing device 10 of the present invention might under the same deceleration pulse have a closure duration of approximately 35 milliseconds. This significant difference permits much greater flexibility and simplicity in circuits designed to detect sudden deceleration of the vehicle and then actuate the relays for operation of safety circuits in the vehicle.

Figure 4:
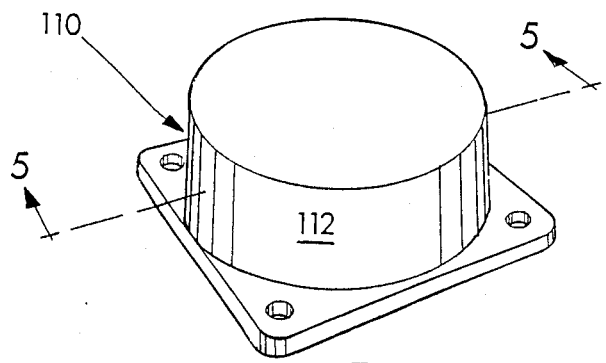
FIG. 4 is a perspective view of an alternate embodiment of the extended dwell shock sensing device that is capable of detecting acceleration forces in multiple directions.
Figure 5:
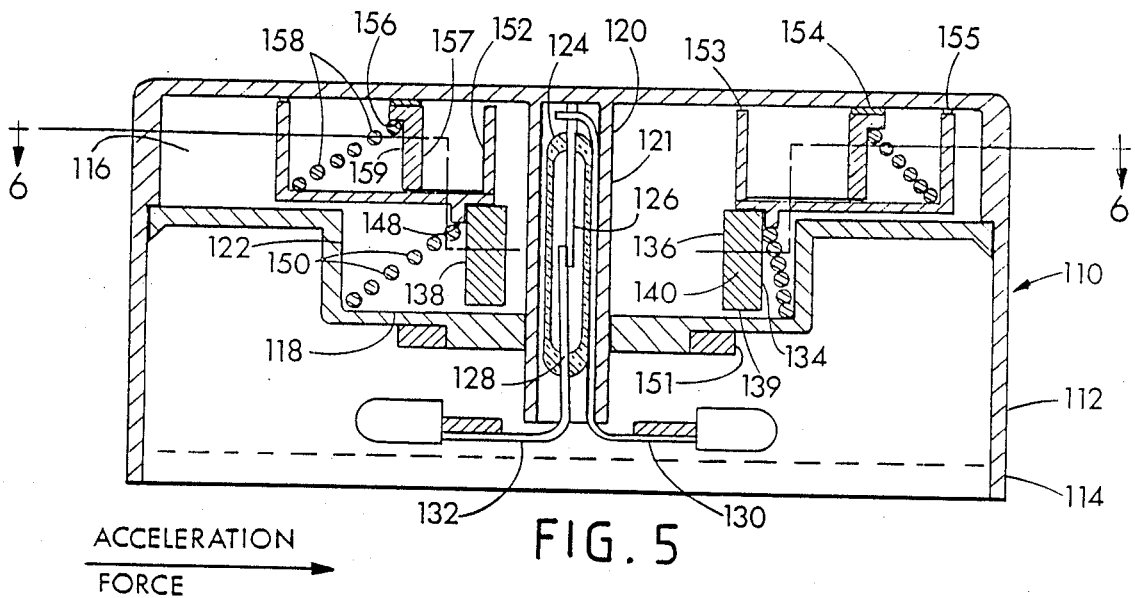
FIG. 5 is a section view of the alternate embodiment taken along line 5—5 of FIG. 4.
Figure 6:
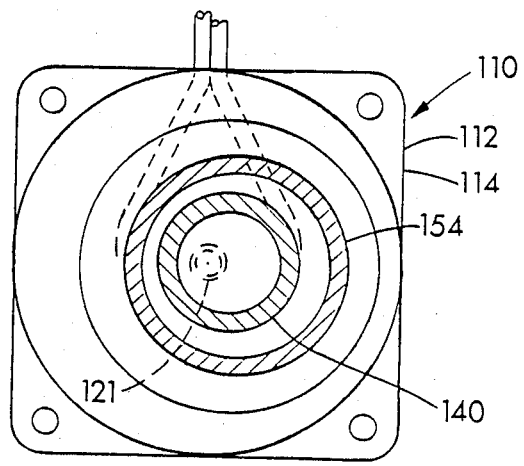
FIG. 6 is a horizontal section view of the alternate embodiment taken along line 6—6 of FIG. 5.

FIGS. 4, 5, and 6 show an alternate embodiment 110 of the extended dwell shock sensing device of the present invention that detects acceleration forces in multiple directions. The shock sensing device 110 includes a capsule 112 having a housing 114 that defines a cavity 116. The interior of the cavity is bounded by a first abutment 120 formed by the outer margin of a vertical reed switch compartment in the preferred form of a pipe 121, a second abutment 122 formed by the inner diameter of a circumferential wall, and a flat ledge 118 extending between the abutments 122 and 122. Mounted within the vertical pipe 121 is a reed switch 124 having contact blades 126 and 128, normally in the open position. The contact blades 126 and 128 are electrically connected with switch terminals 130 and 132. An annular carriage 134 has an inner diameter 136, an outer diameter 138, and a bottom end 139 such that the bottom end 139 of the carriage 134 is slidably mounted upon the ledge 118 and the inner diameter 136 of the carriage 134 is positioned about the pipe 121. The carriage 134 is oriented within the cavity 116 so that the inner diameter 136 of the carriage faces the first abutment 120 and the outer diameter 138 of the carriage 134 faces the second abutment 122. The carriage 134 includes and is partially formed by a permanent magnet 140 that moves coincident with the carriage 134. The magnet 140 has its north and south poles in a vertical orientation.

The outer diameter 138 of the carriage 134 has a notch 148 that allows a ring spring 150 to fit therein, the spring 150 fitting between the second abutment 122 and the outer diameter 138 of the carriage 134. The spring 150 ordinarily biases the carriage 134 such that the inner diameter 136 of the carriage 134 is concentrically positioned about the first abutment 120, and away from the second abutment 122. A magnetic washer 151 is mounted beneath the ledge 118 and the magnetic attractive forces between the magnet 140 and the magnetic washer 151 serve as an additional means of biasing the carriage 134. A circular cradle 152 having a first wall 153 and a second wall 155 is formed within the carriage 134 such that a non-magnetic mass 154 is slidably mounted within the cradle 152 to be capable of travel between the first and second walls 153 and 155. The cradle 152 is oriented so that the first wall 153 faces the first abutment 120 and the second wall 155 is opposite the first wall 153. The non-magnetic mass 154 is annular shaped and has a inner diameter 157 and an outer diameter 159; the inner diameter 157 fits around the first wall 153. The non-magnetic mass 154 has a notch 156 that allows a ring spring 158 to fit therein, the spring 158 fitting between the second wall 155 and the non-magnetic mass 154. The spring 158 ordinarily biases the non-magnetic mass 154 such that the inner diameter 157 is concentrically positioned about the first wall 153 and away from the wall 155.

The shock sensing device 110, as embodied in FIGS. 4 and 5, is used to sense an acceleration force having a horizontal component. Since the abutments 120 and 122 have circular geometries, the device 110 is sensitive to horizontal forces from any direction, a 360° range. The non-magnetic mass 154 is capable of travel in a direction parallel to and in general alignment with the travel of the carriage 134.

The operation of the alternate embodiment 110 is analogous to that of the device 10. The device 110 has two stages to extend the dwell time of the carriage 134, thus lengthening the duration of the closure of the contact blades 126 and 128. The first stage is travel of the carriage 134 from a position such that the inner diameter 136 of the carriage 134 is concentrically positioned about the first abutment 120 to a position such that the inner diameter 136 of the carriage 134 will approach the first abutment 120 in a first region. In a second region, the outer diameter 138 of the carriage 134 will approach the second abutment 122. The first and second regions are 180° apart. This first stage takes place upon occurrence the carriage 134 being subjected to an acceleration force of pre-selected magnitude. The second stage is the travel of the non-magnetic mass 154 from a position such that the inner diameter 157 of the non-magnetic mass 154 is concentrically positioned about the first wall 153 to a position such that the inner diameter 157 of the non-magnetic mass 154 will approach the first wall 153 at a first location. At a second location, the outer diameter 159 at the non-magnetic mass 154 will approach the second wall 155. The first and second locations are 180° apart, but in general alignment with the first and second regions defined by the first stage travel of the carriage 134. The second stage travel takes place as an inertia-delayed response to first stage acceleration when the applied acceleration force continues to increase to a second pre-selected magnitude. The inertia of the non-magnetic mass 154 resisting a rapid change in direction of the carriage 134, combined with the relatively long distance to travel back the first stage, extends the time the reed switch 124 stays activated, i.e. the duration of the closure of the contact blades 136 and 128.

The two preferred embodiments of the invention illustrated and described herein are illustrative of the different forms which the invention may take. Though the reed switch 24 or 124 is shown to be normally open and activated upon passage of a magnet 40 or 140 in proximate relation to the reed switch 24 or 124, it would be instead possible for the reed switch to be normally closed and activated upon passage of a shunt in proximate relation. Though a two-stage shock sensing device is herein disclosed, it is herein intended that multiple stage shock sensing devices fall within the scope of the disclosure and claims. It is also to be understood that other geometries and arrangement of parts would be possible in the present invention.

The invention is not therefore confined to the particular construction and arrangement of parts herein illustrated and described, but embraces such modified forms thereof as come within the scope of the following claims.

What is claimed is:

1. A shock sensor having an extended activation time comprising:
   (a) a housing;
   (b) a carriage slidably mounted on the housing for travel and including a magnet portion;
   (c) a non-magnetic mass slidable on the carriage between a first site and a second site on the carriage;
   (d) a reed switch mounted on the housing to be responsive to the position of the magnet such that the reed switch is activated when the magnet travels to a pre-selected activation position during movement of the carriage in response to an initial acceleration force applied to the housing, and the reed switch will remain activated as the non-magnetic mass moves from the first site to the second site in response to an increased acceleration force, then the non-magnetic mass is moved back toward the first site upon cessation of the increased acceleration force, and until the carriage is moved back past the pre-selected activation position.

2. The shock sensor of claim 1 wherein the shock sensor operates in two stages such that the carriage magnet will travel past the pre-selected activation position in a first stage and the non-magnetic mass will travel toward the second site when the increased acceleration force is applied in a second stage.

3. A shock sensor having an extended activation time comprising:
   (a) a housing having a first abutment;
   (b) a second abutment of the housing spaced apart from the first abutment a fixed distance;
   (c) a carriage having a first end and a second end, the carriage being slidably mounted on the housing to travel between the first abutment and the second abutment and oriented so that the first end of the carriage faces the first abutment and the second end of the carriage faces the second abutment, the carriage further comprising;
      (i) a permanent magnet portion that travels coincident with the carriage;
      (ii) a cradle having a first wall and a second wall spaced apart from the first wall a fixed distance;
      (iii) a non-magnetic mass slidably mounted to travel within the cradle of the carriage between the first wall and the second wall, the cradle defining a path of travel for the non-magnetic mass such that the non-magnetic mass is capable of travel parallel to the direction of travel of the permanent magnet, the first wall of the cradle facing the first abutment and the second wall of the cradle opposite the first wall;
   (d) first means for biasing positioned between the carriage and the second abutment, the carriage being held away from the second abutment by the first biasing means until such time that the carriage is subjected to an initial acceleration force of pre-selected magnitude oriented in the direction of the second abutment, the carriage being movable toward the second abutment when subjected to the initial acceleration force;
   (e) second means for biasing positioned between the non-magnetic mass and the second wall, the non-magnetic mass being held away from the second wall by the second biasing means until the non-magnetic mass is subjected to an increased acceleration force of pre-selected magnitude oriented in the direction of the second wall, the non-magnetic mass being movable toward the second wall when subjected to the increased acceleration force; and
   (f) a reed switch mounted on the housing to be responsive to the position of the magnet such that the reed switch is activated when the magnet reaches a pre-selected activation position during movement of the carriage in response to the initial acceleration force, and will remain activated as the non-magnetic mass moves toward the second wall in response to the increased acceleration force, then is moved back toward the first wall by the second biasing means upon cessation of the increased acceleration force, and until the carriage is moved back past the pre-selected activation position by the first biasing means.

4. The shock sensor of claim 3 wherein the shock sensor operates in two stages such that the carriage magnet will travel toward the second abutment when the initial acceleration force is applied in a first stage and the non-magnetic mass will travel toward the second wall when the increased acceleration force is applied in a second stage.

5. The shock sensor of claim 3 wherein the carriage is tubular in shape having an inner diameter that is slidable mounted upon the outside of a compartment of the housing that extends between the first abutment and a second abutment, and wherein the reed switch is positioned within the compartment and is activated as the carriage travels between the first and second abutments.

6. The shock sensor of claim 5 wherein the compartment is horizontal.

7. The shock sensor of claim 5 wherein the compartment is a pipe.

8. The shock sensor of claim 7 wherein the second end of the carriage has a notch and the first spring fits within the notch.

9. The shock sensor of claim 3 wherein the first means for biasing in a first spring.

10. The shock sensor of claim 3 wherein the second means for biasing is a second spring.

11. The shock sensor of claim 10 wherein the non-magnetic mass has a notch and the second spring fits within the notch.

12. The shock sensor of claim 3 where in the first abutment is an outer margin of a compartment of the housing and the second abutment is an inner diameter of a circumferential wall and a ledge extends between the compartment and the circumferential wall, and wherein the carriage is annular in shape having an inner diameter and an outer diameter such that the inner diameter of the carriage forms the first end of the carriage and the outer diameter of the carriage forms the second end of the carriage, the inner diameter of the carriage being positioned about the compartment and being slidably mounted on the ledge, the reed switch being positioned within the compartment to be closed by the magnet as the carriage travels between the outer margin of the compartment and the inner diameter of the circumferential wall.

13. The shock sensor of claim 12 wherein the compartment is vertical.

14. The shock sensor of claim 12 wherein the compartment is a pipe.

15. The shock sensor of claim 12 wherein the first means for biasing is a first ring spring which is engaged between the carriage and the inner diameter of the circumferential wall.

16. The shock sensor of claim 15 wherein the outer diameter of the carriage has a notch and the first ring spring fits within the notch.

17. The shock sensor of claim 12 wherein the second means for biasing is a second ring spring which is engaged between the non-magnetic mass the second wall.

18. The shock sensor of claim 17 wherein the cradle of the carriage is circular and the non-magnetic mass is annular and fits within the circular cradle.

19. The shock sensor of claim 18 wherein the non-magnetic mass has a notch and the second ring spring fits within the notch.

20. A shock sensor having an extended activation time comprising:
    (a) a housing having a first abutment;
    (b) a second abutment of the housing spaced apart from the first abutment a fixed distance;
    (c) a compartment of the housing extending between the first and second abutments;
    (d) a carriage having a first end and a second end, the carriage being tubular in shape and having an inner diameter that is slidabaly mounted to travel upon the outside of the compartment, and oriented so that the first end of the carriage faces the first abutment and the second end of the carriage faces the second abutment, and the carriage further comprising:
        (i) a permanent magnet portion that travels coincident with the carriage;
        (ii) a cradle having a first wall and a second wall spaced apart from the first wall a fixed distance;
        (iii) a non-magnetic mass slidably mounted to travel within the cradle, the cradle defining a path of travel for the non-magnetic mass such that the non-magnetic mass is capable of travel generally parallel to the direction of travel of the permanent magnetic portion, the first wall of the carriage facing the first abutment and the second wall of the carriage opposite the first wall:
    (d) first means for biasing engaged between the carriage and the second abutment, the carriage being held by the first biasing means away from the second abutment until such time that the carriage is subjected to an initial acceleration force of pre-selected magnitude oriented in the direction of the second abutment, the carriage being movable toward the second abutment when subjected to the initial acceleration force;
    (e) second means for biasing engaged between the non-magnetic mass and the second wall, the non-magnetic mass being held away from the second wall by the second biasing means until the non-magnetic mass is subjected an increased acceleration force of pre-selected magnitude oriented in the direction of the second wall, the non-magnetic mass being movable toward the second wall when subjected to the increased acceleration force; and
    (f) a reed switch mounted within the compartment and responsive to the position of the magnet such that the reed switch will be activated when the magnet reaches a pre-selected activation position as the carriage travels between the first and second abutments during movement of the carriage in response to the initial acceleration force, and will remain activated as the non-magnetic mass moves toward the second wall in response to the increased acceleration force, then is moved back toward the first wall by the second biasing means upon cessation of the increased acceleration force, and until the carriage is moved back past the pre-selected activation position by the first biasing means.

21. The shock sensor of claim 20 wherein the reed switch extends horizontally within the compartment.

22. The shock sensor of claim 20 wherein the compartment is a pipe.

23. The shock sensor of claim 20 wherein the first means for biasing is a first spring.

24. The shock sensor of claim 20 wherein the second means for biasing is a second spring.

25. The shock sensor of claim 23 wherein the second end of the carriage has a notch and the first spring fits within the notch.

26. The shock sensor of claim 23 wherein the non-magnetic mass has a notch and the second spring fits within the notch.

27. A shock sensor comprising:
    (a) a housing having a compartment and a circumferential wall surrounding the compartment, a first abutment formed by the outer margin of the compartment;
    (b) a second abutment formed by the inner diameter of the circumferential wall and spaced apart from the first abutment a fixed distance;
    (c) a ledge of the housing extending between the first abutment and the second abutment;
    (d) an annular carriage having, an inner diameter, an outer diameter, and a bottom end of the carriage being slidably mounted to travel on the ledge and oriented so that the inner diameter of the carriage faces the first abutment and the outer diameter of the carriage faces the second abutment, and the carriage further comprising;
        (i) a permanent magnet portion that travels coincident with the carriage;
        (ii) a cradle having a first wall and a second wall spaced apart from the first wall a fixed distance;
        (iii) a non-magnetic mass slidably mounted to travel within the cradle, the cradle defining a path of travel for the non-magnetic mass from the travel of the magnet such that the non-magnetic mass id capable of travel generally parallel to the direction of travel of the permanent magnetic portion the first wall of the carriage facing the first abutment and the second wall of the carriage opposite the first wall;
    (e) first means for biasing engaged between the carriage and the second abutment, the carriage being held by the first biasing means away from the second abutment until such time that the carriage is subjected to an initial acceleration force of pre-selected magnitude oriented in the direction of the second abutment, the carriage being movable toward the second abutment when subjected to the initial acceleration force;
    (f) second means for biasing engaged between the non-magnetic mass and the second wall, the non-magnetic mass being held away from the second wall by the second biasing means until the non-magnetic mass is subjected to an increased acceleration force of pre-selected magnitude generally oriented in the direction of the second wall, the non-magnetic mass being movable toward the second wall when subjected to the increased acceleration force; and (g) a reed switch mounted within the compartment and responsive to the position of the magnet such that the reed switch will be activated when the magnet reaches a pre-selected activation position as the carriage travels between the first and second abutments during movement of the carriage in response to the initial acceleration force, and will remain activated as the non-magnetic mass moves toward the second wall in response to increased acceleration force, then is moved back toward the first wall by the second biasing means upon cessation of the increased acceleration force, and until the carriage is moved back past the pre-selected activation position of the first biasing means.

28. The shock sensor of claim 27 wherein the compartment is vertical.

29. The shock sensor of claim 28 wherein the compartment is a pipe.

30. The shock sensor of claim 27 wherein the first means for biasing is a first ring spring.

31. The shock sensor of claim 27 wherein the second means for biasing is a second ring spring.

32. The shock sensor of claim 30 wherein the carriage has a notch and the first ring spring fits within the notch.

33. The shock sensor of claim 31 wherein the cradle is circular and the non-magnetic mass is annular and fits within the circular cradle.

34. The shock sensor of claim 33 wherein the non-magnetic mass has a notch and the second ring spring fits within the notch.

* * * * *

UNITED STATES PATENT AND TRADEMARK OFFICE
CERTIFICATE OF CORRECTION

PATENT NO. : 4,877,927

DATED : October 31, 1989

INVENTOR(S) : Reneau

It is certified that error appears in the above-identified patent and that said Letters Patent is hereby corrected as shown below:

In the Specification, column 3, line 65 of the Patent, "read" should read --reed--.

In the Specification, column 5, line 33 of the Patent, the first "122" should read --120--.

In Claim 5, column 8, line 29 of the Patent, "slidable" should read --slidably--.

In Claim 9, column 8, line 43 of the Patent, "in" should read --is--.

In Claim 12, column 8, line 49 of the Patent, "where in" should read --wherein--.

In Claim 17, column 9, line 10 of the Patent, --and-- should be inserted between "non-magnetic mass" and "the second wall."

In Claim 20, column 9, line 43 of the Patent, ":" should read --;--.

In Claim 20, column 9, line 57 of the Patent, --to-- should be inserted between "subjected" and "an".

In Claim 27, column 10, line 32 of the Patent, the comma immediately following "having" should be deleted.

In Claim 27, column 10, line 33 of the Patent, --, the bottom end-- should be inserted between "a bottom end" and "of the carriage".

In Claim 27, column 10, line 47 of the Patent, "id" should read --is--.

Signed and Sealed this

Twenty-fifth Day of December, 1990

Attest:

HARRY F. MANBECK, JR.

*Attesting Officer*  *Commissioner of Patents and Trademarks*